United States Patent [19]
Goodwin et al.

[11] 3,731,107
[45] May 1, 1973

[54] OPTICAL SHAFT ENCODER

[75] Inventors: Raymond W. Goodwin, Westport; James J. Alimena, Fairfield, both of , Conn.

[73] Assignee: United Aircraft Corporation, East Hartford, Conn.

[22] Filed: Dec. 15, 1971

[21] Appl. No.: 208,348

[52] U.S. Cl. ......250/231 SE, 250/219 DD, 250/227, 340/271
[51] Int. Cl. ..............................G01d 5/34
[58] Field of Search ....................250/227, 219 DD, 250/231 SE; 350/96 R; 356/152; 340/271

[56] References Cited

UNITED STATES PATENTS

| | | | |
|---|---|---|---|
| 3,610,941 | 10/1971 | West | 250/219 DD |
| 3,491,245 | 1/1970 | Hardesty | 250/227 |
| 3,596,178 | 7/1971 | Sklyaruk | 250/227 |
| 2,883,649 | 4/1959 | King, Jr. | 250/227 X |
| 3,444,385 | 5/1969 | Paglee | 350/96 R X |
| 3,237,012 | 2/1966 | Treffeisen | 250/219 DD |

*Primary Examiner*—Walter Stolwein
*Attorney*—Melvin P. Williams

[57] ABSTRACT

Light is transmitted through the edge of a transparent cylinder, a portion of the light inside the cylinder being incident to at least one face thereof at greater than the critical angle between the cylinder and air. Light escapes from the faces at a plurality of selected locations thereon in a plurality of unique output patterns, associated with angular positions of the cylinder. Stationary optical detectors, opposite the faces, detect the escaping light when the cylinder is rotated to a position that places a selected location opposite an optical detector. The optical detectors provide signals representative of a unique pattern and hence the angular position of the cylinder.

In one embodiment a material having an index of refraction intermediate to that of the cylinder and air is disposed at the selected locations, providing a critical angle greater than the critical angle between the cylinder and the environment, thereby causing light to escape through the faces only at the selected locations.

In another embodiment, notches in the faces of the cylinder are disposed at the selected locations, the notches being at an angle so that light is incident thereto at an angle less than the critical angle, thereby causing light to escape through the faces only at the selected locations.

3 Claims, 5 Drawing Figures

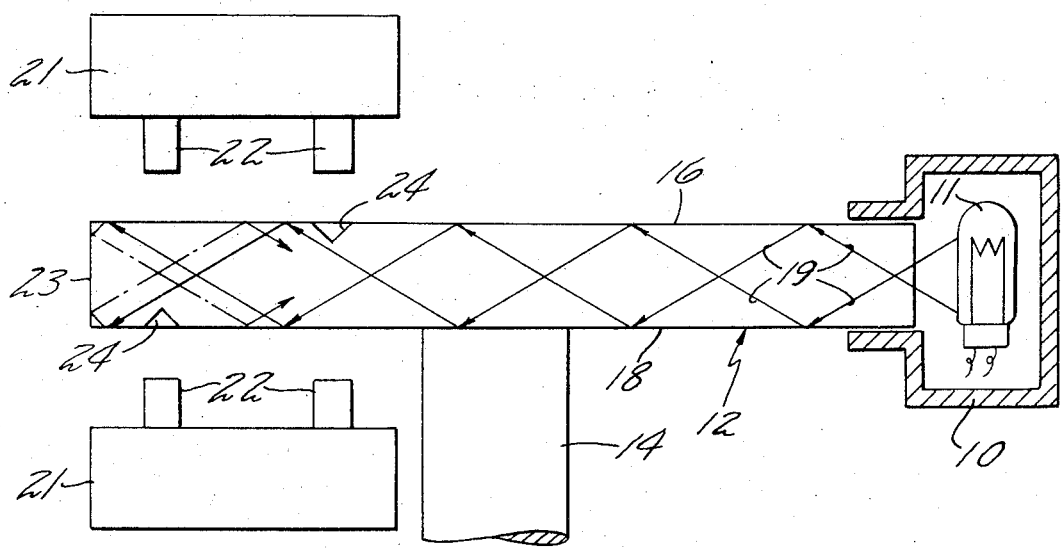
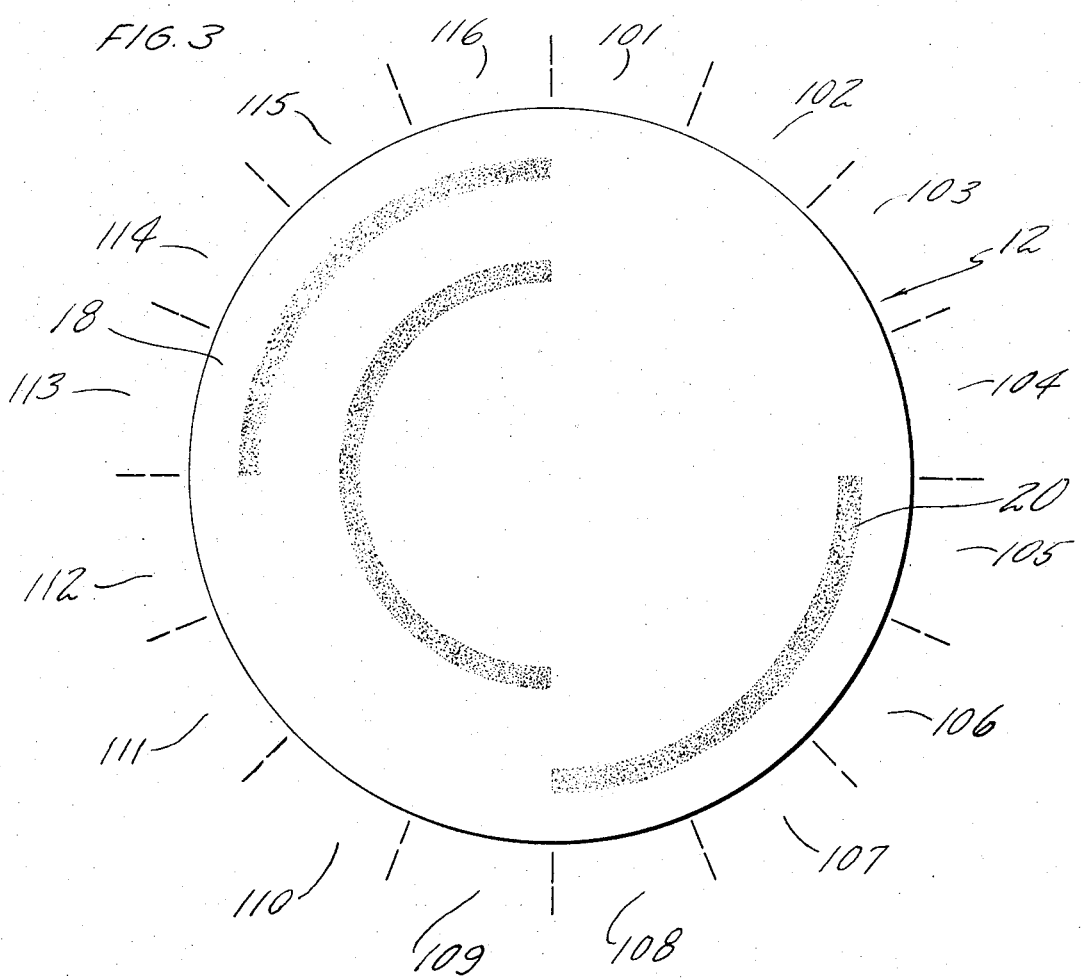

OPTICAL SHAFT ENCODER

BACKGROUND OF THE INVENTION

1. Field of the Invention

This invention relates to electro-optical instrumentation and more particularly to optical apparatus for providing a signal representation of the angular position of a shaft.

2. Description of the Prior Art

Shaft encoders are used to provide a signal representation of the precise angular position of a shaft in gun laying equipment, apparatus for determining the pointing angle of a radar antenna and in a plethora of other applications.

A conventional optical shaft encoder known in the prior art comprises a disc that is axially mounted and fixedly secured to a shaft. The disc has areas of transparency and opacity that provides a plurality of unique patterns, each pattern associated with a resolvable angular position of the disc. A stationary light source is disposed adjacent to one face of the disc for providing light through the disc so that light emerges therefrom through the transparent portions. A plurality of stationary photodetectors adjacent the other face of the disc sense a pattern of emerging light from the opposing portion of the disc and provide a signal representation of the position of the shaft in response thereto (often in the form of a digital code).

The shaft encoder described hereinbefore usually requires a plurality of focusing lenses between the light source and the disc (one for each photodetector) as well as a costly coalignment of the lenses, the disc, and the photodetectors in order to reduce the amount of undesired light (light not associated with the pattern identifying the shaft's angular position) that may be provided to a photodetector. The undesired light is analogous to the undesired "crosstalk" that is commonly experienced between communication channels and may cause the photodetectors to provide an erroneous signal representation.

The amount of undesired light that is provided to a photodetector is related to the size of the coding disc since a larger disc permits greater spacing between transparent portions of the pattern.

Optical shaft encoders known in the prior art are therefore bulky, require an expensive alignment process in their construction and are unreliable.

SUMMARY OF THE INVENTION

An object of the present invention is to provide an improved optical shaft encoder that does not require a costly coalignment of its elements.

According to the present invention, a cylinder having an index of refraction greater than that of the environment has a material disposed upon at least one face thereof in a unique pattern, said material having an index of refraction intermediate to that of the environment and the cylinder; light within the cylinder, directed at an angle intermediate to the critical angle associated with the cylinder and the environment and the critical angle associated with the cylinder and the material, escapes from the cylinder, passing through the material and into the environment, thereby providing a unique output pattern of light.

In further accord with the present invention, a cylinder having an index of refraction greater than that of the environment has at least one notch in at least one face thereof in a unique pattern; light within the cylinder, directed so that it is incident to a face of the cylinder at greater than a critical angle associated with the cylinder and the environment and incident to the notch at less than said critical angle, escapes from the cylinder, passing through each notch of the aligned pattern into the environment, thereby providing a unique output pattern of light.

The invention provides a shaft encoder that may utilize both faces of a cylinder for providing an encoding pattern and eliminates the requirement of focusing lenses.

The invention may be adapted to provide a visual indication of the angular position of a shaft.

Other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a plan view of the other of two faces of a transparent cylinder with an intermediate index material disposed thereon;

FIG. 4 is a simplified side elevation view, partly in section of a second embodiment of the present invention that includes notches in the faces of a transparent cylinder.

DESCRIPTION OF THE PREFERRED EMBODIMENTS

Figure 1:
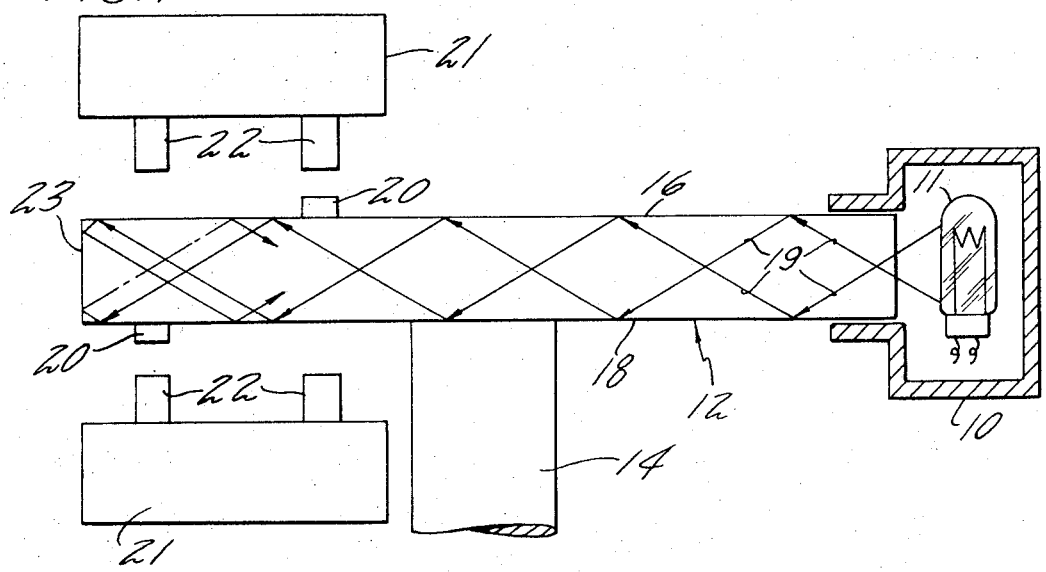
FIG. 1 is a simplified side elevation view, partly in section of one embodiment of the present invention that includes an intermediate index material disposed upon the faces of a transparent cylinder.

Referring now to FIG. 1, a shaft encoder is comprised of a stationary light source 10, including an incandescent lamp 11, which provides light which is coupled into the edge of a cylinder 12 which is axially mounted and fixedly secured to a rotatable shaft 14, the angular position of which is to be encoded, (thereby causing the angular positions of the shaft 14 and the disc 12 to be identical). The cylinder 12 may be made from a transparent medium, such as polycarbonate, which has an index of refraction substantially equal to 1.6. For reasons made apparent hereinafter, in the preferred embodiments it is essential that the index of refraction of the cylinder 12 be greater than one, which is the index of refraction of air.

As is well known in the art, a light beam that is incident to a boundary between two mediums is totally reflected unless the angle of incidence (the angle of the beam measured with respect to a line perpendicular to the boundary) is less than the critical angle which is given as:

$$\phi_c = \sin^{-1}(n_2/n_1)$$

where $n_1$ is the index of refraction of a first medium within which there may be light beam; and $n_2$ is the index of refraction of a second medium that bounds the first medium.

The source 10 provides non-collimated light that is comprised of components incident to the faces 16, 18 of the cylinder 12 at greater than the critical angle, incident to the faces 16, 18 at less than the critical angle or incident to the edge of the cylinder 12. The length of the cylinder 12 is short compared with its radius so that light incident to the faces 16, 18 at greater than the critical angle, such as the light beam 19, causes multiple reflections between the faces 16, 18 over substantially the entire area thereof; typically, the cylinder 12 may have a length of 0.15 inches and a radius of 1.5 inches. The geometry of the cylinder 12 causes the light near the source 10 to be incident to the faces 16, 18 at less than the critical angle and therefore to pass through the faces 16, 18 in a region close to the source 10. Light incident to the edges of the cylinder 12 at less than the critical angle serves to illuminate the edge 23 by passing therethrough, thereby providing light for an illuminated numerical scale as explained hereinafter. Light incident to the edge at less than the critical angle may cause reflections of light between the faces 16, 18 or may cause light to pass therethrough (in a manner similar to light from the source 10 incident upon the faces 16. 18). In the environment such as air, the critical angle is 39° (since $n_1 = 1.6$, $n_2 = 1$ and $\phi_c = \sin^{-1}(1/1.6) = 39°$).

An intermediate index material 20 is disposed by vacuum deposition or by any other suitable means, at selected locations upon the faces 16, 18 in a plurality of unique output patterns, each associated with a resolvable angular position of the cylinder 12 (and the shaft 14). The material 20 has an index of refraction intermediate to 1 and 1.6, so that the critical angle between the cylinder 12 and the material 20 is greater than 39°; the greater critical angle allows light to escape from the cylinder 12 at the selected locations, thereby providing unique output patterns of light. Optical detection units 21, comprising optical detectors 22, detect the escaping light from an aligned pattern and provide electrical signals in response thereto.

As is well known in the art, an intermediate index material having an index of refraction that is the geometric mean of indexes of refraction of polycarbonate and air causes a maximum amount of light to escape from the cylinder 12, pass through the material 20, and into the air (to the detectors 22). Therefore, in this embodiment of the invention an index of refraction of $\sqrt{1.6} = 1.28$ is best suited for the material 20. Magnesium fluoride (index of refraction of 1.38) and cryolite (index of refraction of 1.35) are examples of optical coating materials having an index of refraction close enough to 1.28 so that they are suitable for use in this embodiment; additionally, these materials are structurally resistant to shock and vibration.

Figure 2:
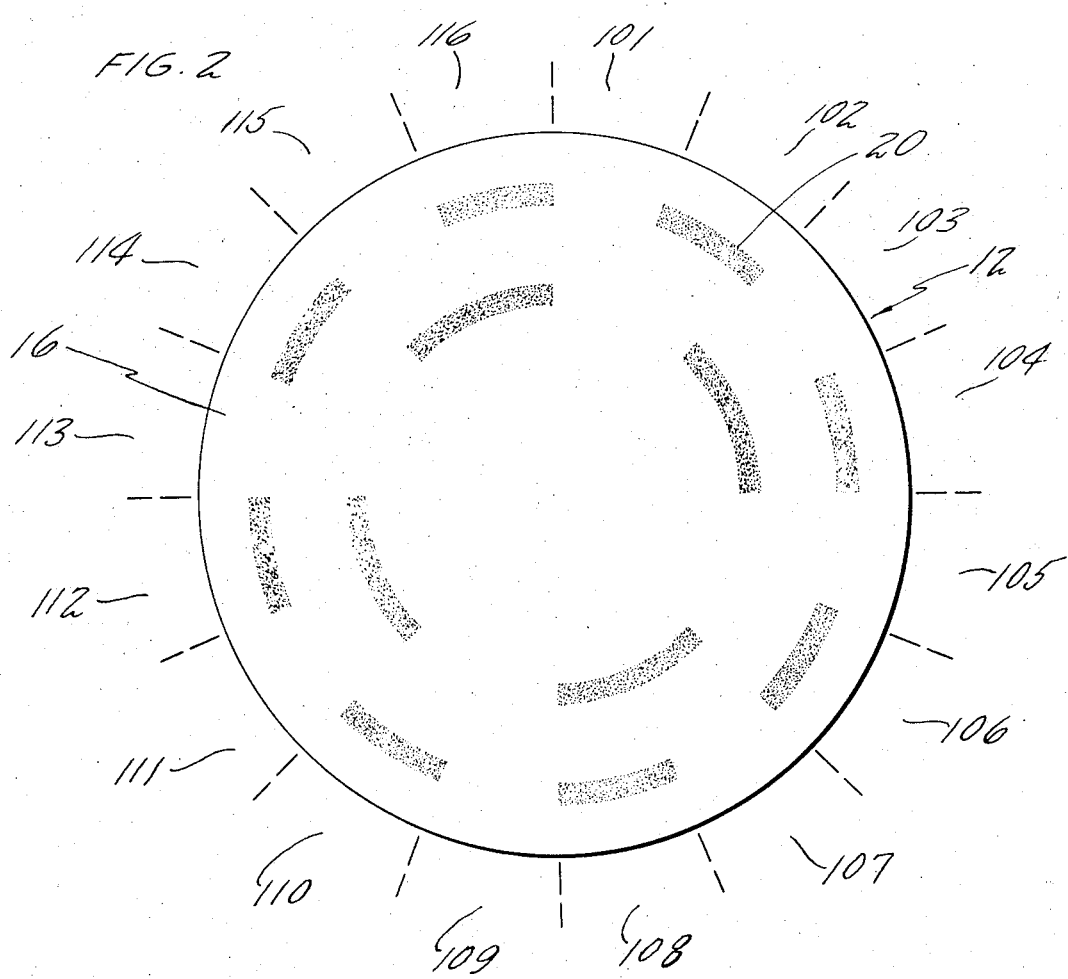
FIG. 2 is a plan view of one of two faces of a transparent cylinder with an intermediate index material disposed thereon.

Referring to FIGS. 1-3, the disposition of the material 20 at selected locations upon the faces 16, 18 defines sixteen resolvable angular positions in the form of a natural binary code (FIG. 2 and FIG. 3). The positions bear reference numeral designations 101 through 116, each of which is distinguished by the presence or absence of the material 20 at selected radii on the faces 16, 18. The optical detectors 22 (two opposite the face 16 and the two opposite the face 18 in FIG. 1) are located opposite the radii where they detect escaping light when the cylinder 12 is rotated to a position that places a selected location opposite an optical detector. FIG. 1, for example, is an illustration of the cylinder 12 at an angular position that causes the detectors 22 to provide a signal representation of position 107 (FIGS. 2 and 3).

Referring now to FIG. 4, the digital code may be in the form of the absence and presence of notches 24 that are ground into the faces 16, 18, or provided in any suitable manner. The notches 24 are disposed at selected locations similar to the locations of the material 20 described hereinbefore and are preferably at the critical angle from a line perpendicular to the faces 16, 18; light reflected upon the notches is thereby incident at greater than the critical angle, causing light to escape therefrom. The size of the notches 24 may be made to coincide with the size of the selected locations associated therewith, thereby causing the escaping light to be a maximum. This principle of permitting light to selectively escape from a surface is most commonly used on edge-lit display panels.

In the embodiments described hereinbefore, the cylinder 12 is made from plastic (instead of glass) because most plastics are structurally resistant to shock and vibration. As alternatives to polycarbonate, the cylinder 12 may be made from plastics such as polyester-styrene, allyl diglycol carbonate and polystyrene.

Figure 5:
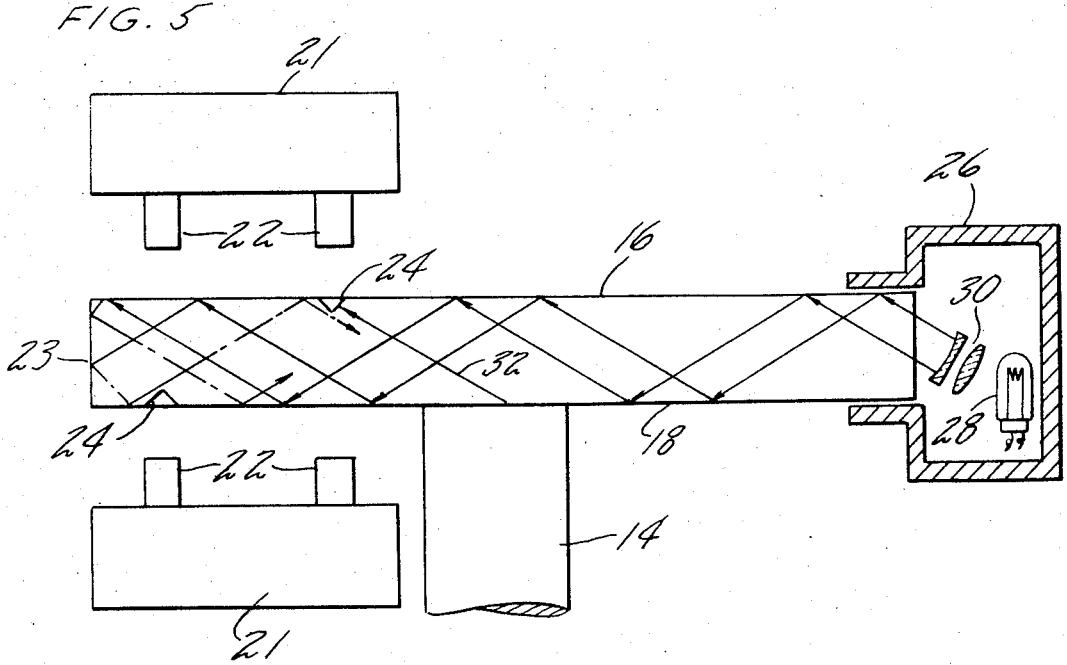
FIG. 5 is a simplified elevation view partly in section of a third embodiment of the present invention that utilizes collimated light.

It should be understood that the invention may utilize a source of collimated light. Referring to to FIG. 5, a light source 26, comprising an incandescent lamp 28 and lenses 30, provides collimated light through the edge of the cylinder 12. The collimated light is incident to the edge 16 at an angle of 45° (which is greater than 39°, the critical angle between the cylinder 12 and air). Light, such as a light beam 32, that is reflected from faces 16, 18 upon the notches 24 is incident at an angle of 6° (less than the critical angle) and therefore passes through the notch, into the air and to the detectors 22.

Collimated light incident to one of the edges 16, 18, at an angle of 45° may also be utilized in an embodiment wherein the material 20 is disposed at the selected locations. A critical angle greater than 45° between the material 20 and the cylinder 12 causes light incident upon the material 20 to pass through the material 20, into the air and to the detectors 22. When the material 20 consists of a material with an index of refraction of 1.28, the critical angle between the cylinder 12 and the material 20 is given as:

$$\phi_c = \sin^{-1}(1.28/1.6) = 53°$$

It should be understood that unlike non-collimated light, substantially all of the collimated light is reflected between the faces 16, 18 thereby providing a more efficient utilization of available light.

Means for visually determining the angular position of the cylinder 12 and the shaft 14 may be provided integral with the present invention. A circumferential area of the edge 21 of the cylinder 12 may have a scale thereon that is numerically representative of angular positions of the cylinder 12. The shaft encoder may be encased in a stationary case, and a window and a bench mark may be provided in the case for visually viewing the scale with respect to the bench mark. The scale may be transparent and the circumferential area opaque or, alternatively, the scale may be of a reflective type and the circumferential area transparent. Either alternative provides a scale illuminated by the source 10 in a manner described in U.S. Pat. No. 2,712,593.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A shaft angle encoder comprising:

a cylinder having an index of refraction greater than that of the environment, said cylinder being rotatable about its axis within the environment;

a light source disposed to provide light that is transmitted through the curved edge of said cylinder, said light being incident to at least one planar face of said cylinder at an angle greater than a first critical angle that is associated with the indexes of refraction of said cylinder and the environment thereby causing multiple reflections of said incident light between the planar faces of said cylinder, said cylinder including transparent encoding means disposed contiguous with at least one planar face of said cylinder for permitting light to escape therethrough from said cylinder in an output pattern of light associated with the angular position thereof, said encoding means comprising material having an index of refraction intermediate to the indexes of refraction of said cylinder and the environment, said light source providing said incident light to at least one planar face of said cylinder at an angle intermediate to said first critical angle and a second critical angle associated with the indexes of refraction of said cylinder and said material; and means responsive to said output pattern for providing a signal representative of the angular position in response to said escaping light.

2. A shaft angle encoder comprising:

a cylinder having an index of refraction greater than that of the environment, said cylinder being rotatable about its axis within the environment;

a light source disposed to provide light that is transmitted through the curved edge of said cylinder, said light being incident to at least one planar face of said cylinder at an angle greater than a first critical angle that is associated with the indexes of refraction of said cylinder and the environment thereby causing multiple reflections of said incident light between the planar faces of said cylinder, said cylinder including transparent encoding means disposed contiguous with at least one planar face of said cylinder for permitting light to escape therethrough from said cylinder in an output pattern of light associated with the angular position thereof, said encoding means comprises at least one notch within at least one planar face of said cylinder, said notch being at an angle so that said incident light is incident to the notch at less than said first critical angle; and means responsive to said output pattern for providing a signal representative of the angular position in response to said escaping light.

3. Apparatus according to claim 1 wherein said cylinder is comprised of a plastic and said material is an optical coating material selected from the group consisting of cryolite and magnesium fluoride.

* * * * *